(12) United States Patent
Quinn et al.

(10) Patent No.: US 8,414,137 B2
(45) Date of Patent: Apr. 9, 2013

(54) INSIDE REARVIEW MIRROR ASSEMBLY

(75) Inventors: Charles R. Quinn, Pleasant Ridge, MI (US); Nicholas P. Nagrant, Farmington Hills, MI (US); Eric A. Watterworth, Orion, MI (US); Dennis B. Kazensky, Farmington Hills, MI (US); Mark M. Hadley, Oxford, MI (US); Thomas D. Hagen, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 218 days.

(21) Appl. No.: 12/913,890

(22) Filed: Oct. 28, 2010

(65) Prior Publication Data
US 2012/0105990 A1  May 3, 2012

(51) Int. Cl.
*G02B 7/182* (2006.01)

(52) U.S. Cl. .......................................... 359/871

(58) Field of Classification Search ............. 359/871, 359/872, 879; 248/475.1
See application file for complete search history.

(56) References Cited

U.S. PATENT DOCUMENTS 7,726,623 B2* 6/2010 Muller .................. 248/475.1
7,815,326 B2* 10/2010 Blank et al. ............. 359/879

* cited by examiner

*Primary Examiner* — Euncha Cherry
(74) *Attorney, Agent, or Firm* — Quinn Law Group, PLLC

(57) ABSTRACT

An inside rearview mirror bracket for a windscreen includes a pad portion configured to attach to an interior of the windscreen. A bridge portion is formed as a single piece with the pad portion, and a tunnel is defined by the bridge portion and the pad portion. The mirror bracket includes a mirror receptacle formed as a single piece with the bridge portion opposite the tunnel. The mirror receptacle is configured to receive a rearview mirror. A sensor member may be configured to substantially fill the tunnel, such that the sensor member is disposed intermediate the bridge portion and the windscreen.

16 Claims, 4 Drawing Sheets

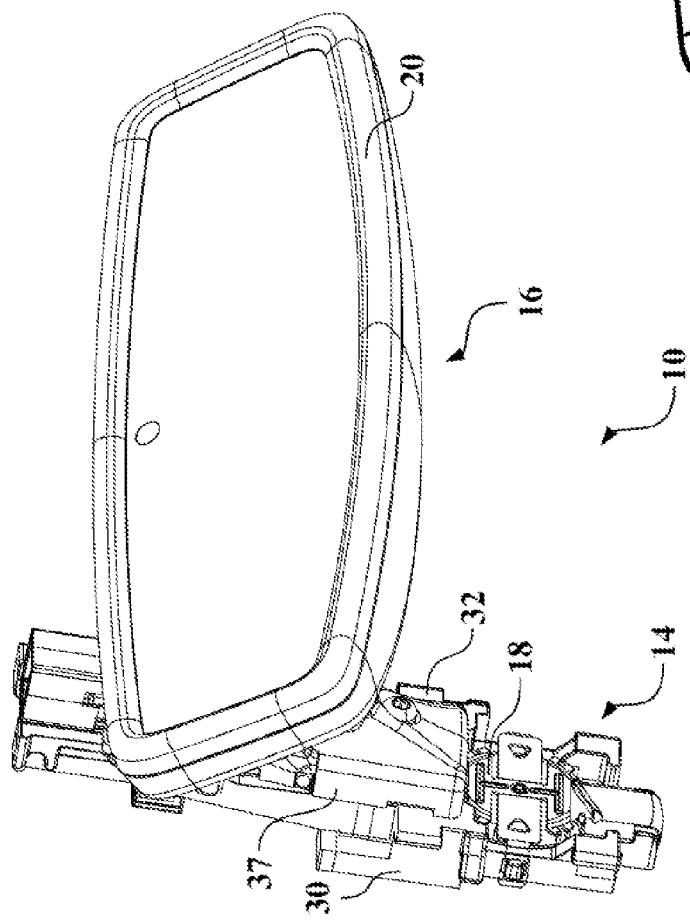
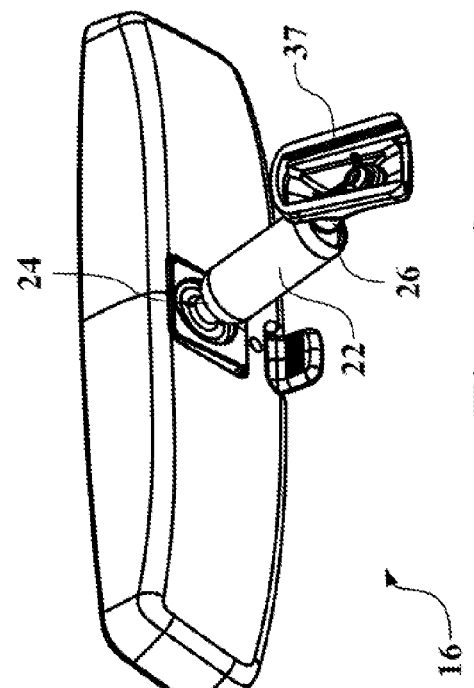
Figure 1
Figure 2

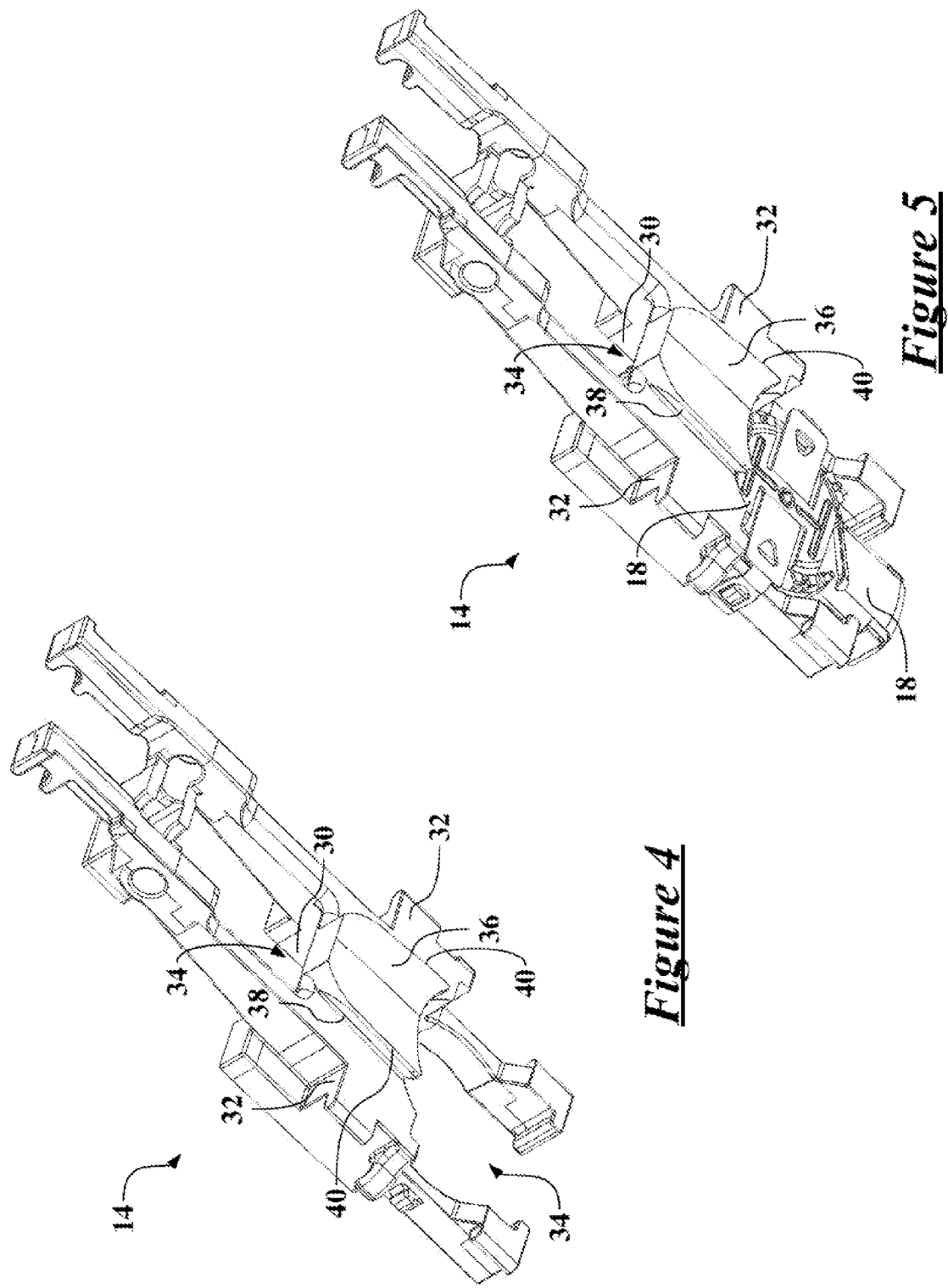

INSIDE REARVIEW MIRROR ASSEMBLY

TECHNICAL FIELD

This disclosure relates to rearview mirrors attachable to windscreens, and to the sensors attached thereto.

BACKGROUND

Some vehicles include a rearview mirror assembly attached to the inside of the vehicle's windscreen. The rearview mirror assembly includes a mirror which allows occupants of the vehicle to see behind the vehicle while facing generally forward. To adjust for drivers of different heights and sizes, and for different seating positions, the rearview mirror assembly may be adjustable to tilt the mirror and change the reflection.

The rearview mirror assembly may include displays of driving data or ambient weather conditions. Furthermore, the rearview mirror assembly may include a video display for use when reversing the vehicle.

SUMMARY

An inside rearview mirror bracket is provided. The mirror bracket is for a windscreen and includes a pad portion configured to attach to an interior of the windscreen. A bridge portion is formed as a single piece with the pad portion, and a tunnel is defined by the bridge portion and the pad portion.

The mirror bracket includes a mirror receptacle formed as a single piece with the bridge portion opposite the tunnel. The mirror receptacle is configured to receive a rearview mirror. A sensor member may be configured to substantially fill the tunnel, such that the sensor member is disposed intermediate the bridge portion and the windscreen.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 1 is a schematic isometric view of a rearview mirror assembly;

FIG. 2 is a schematic isometric view of the opposite side of the rearview mirror shown in FIG. 1;

FIG. 4 is a schematic isometric view of a mirror bracket;

FIG. 5 shows the same view of the mirror bracket as FIG. 4 and includes a sensor member disposed within a tunnel of the mirror bracket;

DETAILED DESCRIPTION

Figure 3:
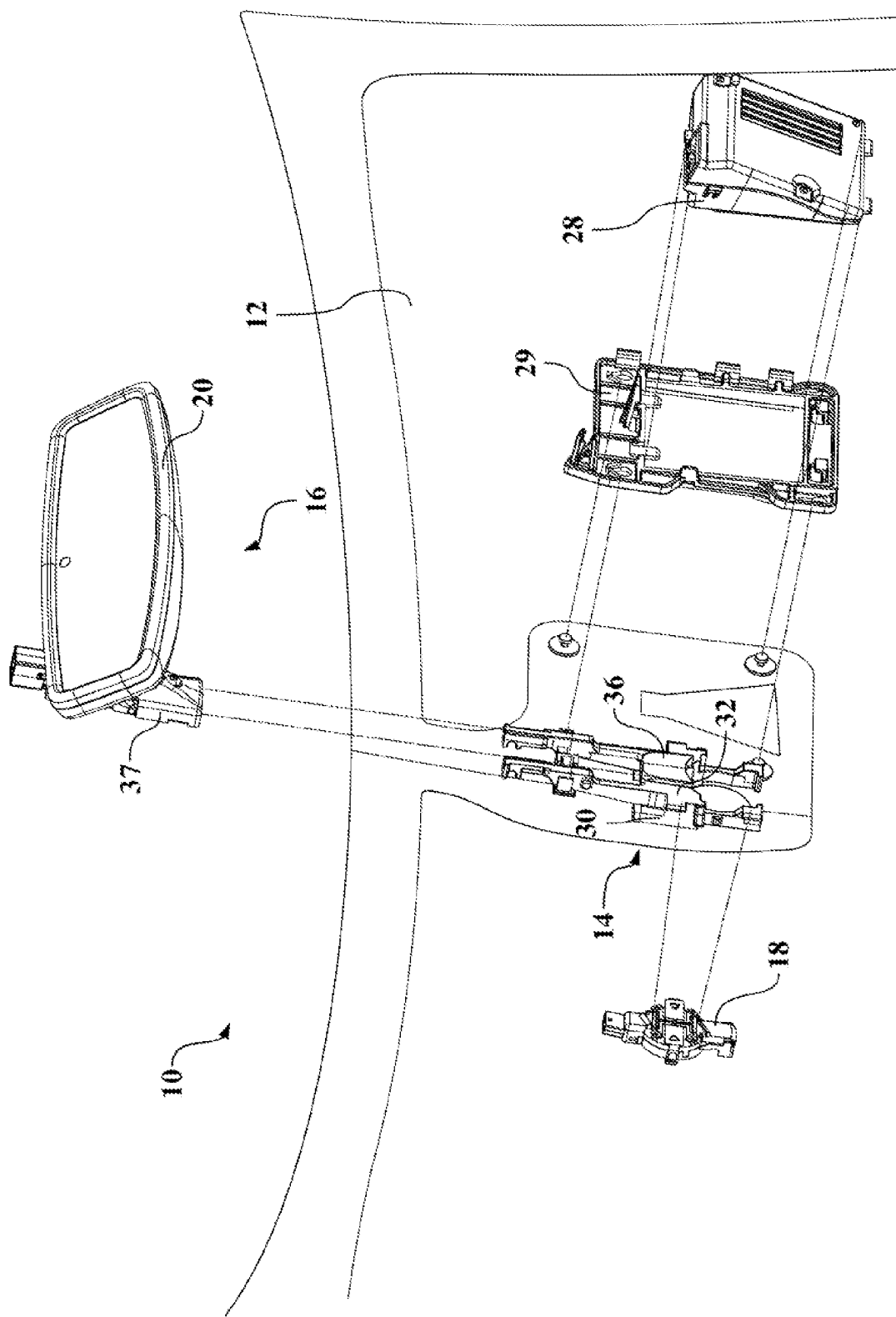
FIG. 3 is a schematic exploded isometric view of the rearview mirror assembly shown in FIG. 1.

Referring to the drawings, wherein like reference numbers correspond to like or similar components throughout the several figures, there are shown in FIG. 1, FIG. 2, and FIG. 3 three views of a rearview mirror assembly 10. FIG. 1 shows a schematic isometric view of the mirror assembly 10. FIG. 2 shows a schematic isometric view of the opposite side of a portion of the mirror assembly 10. FIG. 3 shows an exploded isometric view of the mirror assembly 10. The mirror assembly 10 is fixedly attached, as described herein, to the interior of a windscreen 12.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The mirror assembly 10 includes a mirror bracket 14 and a rearview mirror 16. The mirror bracket 14 attaches the rearview mirror 16 to the windscreen 12, and may be adhered to the windscreen 12 during production of the windscreen 12. The mirror bracket 14 may be produced separately from the windscreen 12, or the mirror bracket 14 may be produced together with the windscreen 12 and the remainder of the mirror assembly 10 subsequently affixed thereto.

The mirror assembly 10 also includes a sensor member 18. Depending upon the configuration of the mirror assembly 10 and the vehicle into which it is being placed, the sensor member 18 may include a humidity sensor, a rain sensor, both, or additional sensors. Additional sensors, cameras, or components may also be attached or incorporated into the mirror assembly 10. The humidity sensor and rain sensor of the sensor member 18 may experience improved functionality when located very near the windscreen 12.

In the configuration shown in the figures, the sensor member 18 is placed immediately adjacent to, or in direct contact with, the interior of the windscreen 12. Furthermore, the sensor member 18 is located on the same mid-plane of the mirror assembly 10. Therefore, the rearview mirror 16 shares a center plane with the sensor member 18 and the mirror bracket 14—although the rearview mirror 16 may be adjusted off of the center plane by the operator of the vehicle.

The mirror bracket 14 may include nubs, brackets, or clips to hold the sensor member 18 against the windscreen 12. The mirror bracket 14 may also have holes or pathways for attaching an electrical connector (not shown) for the sensor member 18 and hooks for retaining the electrical connector.

A mirror housing 20 holds and protects one or more mirrors. As shown in FIG. 2, the mirror housing 20 is attached to a tube 22. The rearview mirror 16 is a double-pivot mirror, having a first pivot 24 and a second pivot 26. Therefore, the mirror housing 20 has increased range of position and viewing angle due to the ability to pivot about the tube 22 on the first pivot 24 while the tube 22 itself pivots about the second pivot 26.

Each of the first pivot 24 and the second pivot 26 are configured to hold the mirror housing 20 in a substantially-fixed position selected by the vehicle operator. Furthermore, when a force is applied to the rearview mirror 16, such as to a static force to the mirror housing 20, the rearview mirror 16 may itself move to absorb some energy instead of breaking the rearview mirror 16 away from the mirror bracket 14 or the windscreen 12.

As shown in the exploded view of FIG. 3, the mirror assembly 10 may also include one or more accessories and associated brackets, such as a camera module 28 and a camera bracket 29. The mirror bracket 14 may be configured for attachment of a trim plate or trim cover. Furthermore, the mirror bracket 14 may be configured for attachment of either a trim plate covering only the mirror bracket 14 or a larger trim plate covering both the mirror bracket 14 and adjacent accessories, such as the camera module 28.

Referring now to FIGS. 4 and 5, and with continued reference to FIGS. 1-3, there are shown two close-up views of the mirror bracket 14. FIG. 4 shows an isometric view of the mirror bracket 14, shown looking at the mirror bracket 14 from same side as the rearview mirror 16 and opposite the windscreen 12. FIG. 5 shows the same view as FIG. 4, but shows the mirror bracket 14 with the sensor member 18 disposed between the mirror assembly 10 and the windscreen 12.

The mirror bracket 14 includes one or more pad portions 30, which are configured to attach to the interior of the windscreen 12. An epoxy resin or other adhesive may be used to fixedly attach the pad portions 30 to the windscreen 12. The pad portions 30 provide a somewhat-planar base surface for adherence between the windscreen 12 and the pad portions 30. However, the pad portions 30 may be curved or non-planar relative to each other. In many configurations of the mirror assembly 10, if the pad portions 30 separates from the windscreen 12, the whole mirror assembly 10 also separates from the windscreen 12.

A bridge portion 32 is formed as a single piece with the pad portions 30 and extends away from the windscreen 12. A tunnel 34 is defined by the bridge portion 32 and the pad portions 30, such that the tunnel 34 forms an open space between the windscreen 12 and the mirror bracket 14.

The sensor member 18 is configured to substantially fill the tunnel 34. Therefore, when assembled to the mirror bracket 14, the sensor member 18 is disposed intermediate the bridge portion 32 and the windscreen 12. The tunnel 34 may alternatively be defined as the area into which the sensor member 18 is inserted.

Other sensors and other modules than the sensor member 18 may be disposed within the tunnel 34. For example, and without limitation, a GPS antenna, a blue tooth antenna or receiver, an RFID indicator, a small camera, or another module may be disposed within the tunnel 34. Furthermore, the sensor member 18 may be configured to include other sensor functions, such as light sensing.

A mirror receptacle 36 extends away from the bridge portion 32, and is formed as a single piece with the bridge portion 32. Therefore, the pad portions 30, bridge portion 32, and mirror receptacle 36 are all formed as a single piece, as opposed to being formed separately and then fastened, adhered, or otherwise attached together to form the mirror bracket 14.

The mirror receptacle 36 is configured to attach to a housing bracket 37 of the rearview mirror 16. Therefore, the pad portions 30 attach the mirror bracket 14 to the windscreen 12, and the mirror receptacle 36 attaches the rearview mirror 16 to the mirror bracket 14. The bridge portion 32 provides structure to define the tunnel 34 and also supports the mirror receptacle 36.

The mirror receptacle 36 includes a dovetail profile 38 and a wedge profile 40. The dovetail profile 38 and the wedge profile 40 are structures configured to retain the rearview mirror 16 to the mirror bracket 14. The housing bracket 37 of the rearview mirror 16 includes a corresponding wedge configured to interface with the wedge profile 40 of the mirror receptacle 36, and also includes a corresponding dovetail configured to interface with the dovetail profile 38 of the mirror receptacle 36.

To assemble the rearview mirror 16 to the mirror bracket 14, the housing bracket 37 of the rearview mirror 16 may be slid onto the mirror receptacle 36, starting at the thin end of the wedge profile 40 (from the top right toward the bottom left, as shown in FIGS. 4 and 5, or from the top downward, as shown in FIGS. 1 and 3). Depending upon the configuration of the mirror assembly 10, a set screw (not shown) or another locking member may be used to keep the rearview mirror 16 from sliding off of the mirror receptacle 36.

The mirror receptacle 36 and the rearview mirror 16 are both characterized by the absence of a cam-lock member. Therefore, the rearview mirror 16 attaches to the mirror bracket 14 (and to the windscreen 12) only through the dovetail profile 38 and the wedge profile 40 of the mirror receptacle 14. The mirror assembly 10 does not use cam-lock members to fixedly attach to the windscreen 12.

Figure 6:
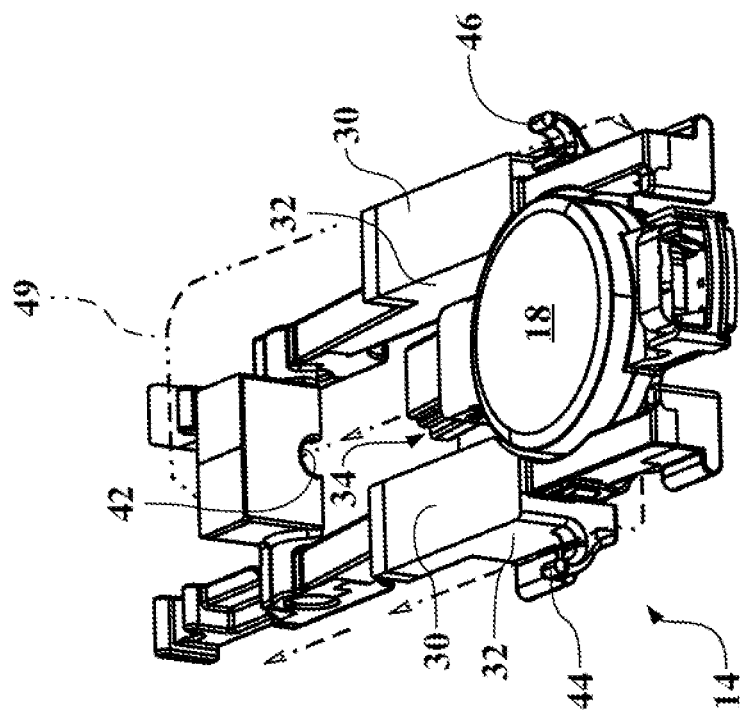
FIG. 6 is another schematic isometric view of the mirror bracket, and schematically shows a first route for a wiring harness.
Figure 7:
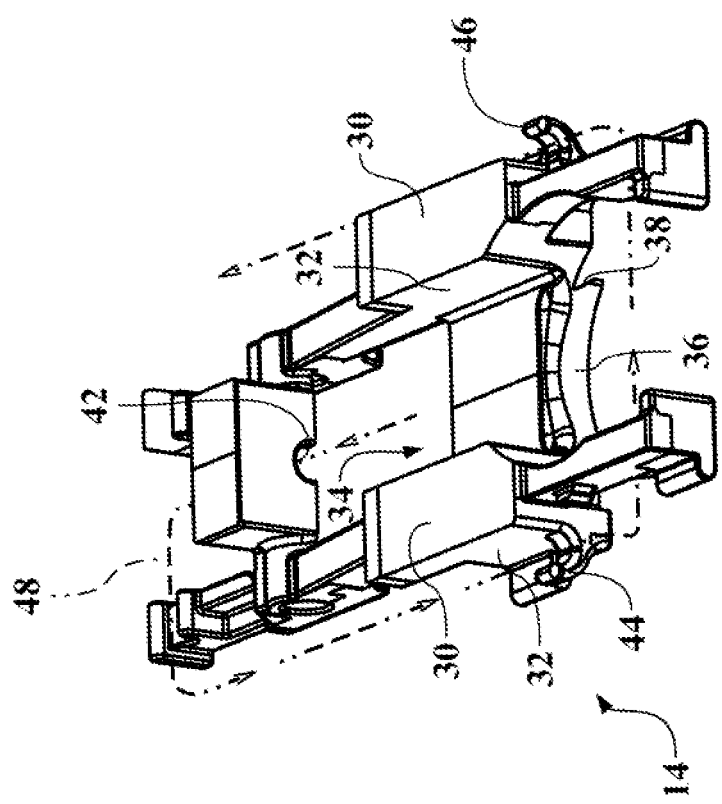
FIG. 7 shows the same view of the mirror bracket as FIG. 6, includes the sensor member disposed within the tunnel of the mirror bracket, and also schematically shows a second route for the wiring harness.

Referring now to FIGS. 6 and 7, and with continued reference to FIGS. 1-5, there are shown two more close-up views of the mirror bracket 14. FIG. 6 shows an isometric view of the mirror bracket 14, as viewed from through the windscreen 12 and opposite the rearview mirror 16. FIG. 7 shows the same isometric view of the mirror bracket 14 as FIG. 6, but is shown with the sensor member 18 attached to the mirror bracket 14 and disposed within the tunnel 34.

As shown in FIGS. 6 and 7, the mirror bracket 14 is configured to route a wiring harness (not shown), group of wires, or single wire. The wiring harness may be attached to the sensor member 18 (which is shown in FIG. 7 but not in FIG. 6) on one end and to another harness at the other end.

The mirror bracket 14 includes a wiring channel 42 formed in line with the tunnel 34. A first wiring hook 44 is disposed on a first side of the bridge portion 32. An open portion of the first wiring hook 44 faces toward the windscreen 12 (generally upward, as viewed in FIGS. 6 and 7). A second wiring hook 46 is disposed on a second side of the bridge portion 32, which is opposite the first side. Similar to the first wiring hook 44, an open portion of the second wiring hook 46 faces the windscreen 12.

The wiring harness is configured to pass through one of a first route 48 for a right-hand drive vehicle, as schematically shown in FIG. 6; and a second route 49 for a left-hand drive vehicle, as schematically shown in FIG. 7. Each of the first route 48 and the second route 49 may be configured to allow the wiring harness to attach to another wiring harness leading to the vehicle roof above the windscreen 12.

The first route 48 passes the wiring harness through the wiring channel 42, then the first wiring hook 44, then over the sensor member 18, and then through the second wiring hook 46. As viewed from the vehicle interior toward the windscreen 12 (generally opposite the viewpoint of FIG. 6), the first route 48 is a clockwise path around the mirror bracket 14. The second route 49 passes the wiring harness through the wiring channel 42, then the second wiring hook 46, then over the sensor member 18, and then through the first wiring hook 44. As viewed from the vehicle interior toward the windscreen 12 (generally opposite the viewpoint of FIG. 7), the second route 49 is a counter-clockwise path around the mirror bracket 14.

The sensor member 18 is disposed substantially within the tunnel 34 and fills substantially all of the space between the windscreen 12 and the bridge portion 32 of the mirror bracket 14. Because the mirror bracket 14 may be attached to the windscreen 12 before the remainder of the mirror assembly 10 is attached, the sensor member 18 is configured to be inserted into the tunnel 34 after the pad portion 30 is adhered to the interior of the windscreen 12. The wiring harness is also partially disposed between the mirror bracket 14 and the windscreen 12.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An inside rearview mirror bracket for a windscreen, comprising:
   a pad portion, wherein the pad portion is configured to attach to an interior of the windscreen;
   a bridge portion formed as a single piece with the pad portion;
   a tunnel defined by the bridge portion and the pad portion; and
   a mirror receptacle formed as a single piece with the bridge portion opposite the tunnel, wherein the mirror receptacle is configured to receive a rearview mirror.

2. The mirror bracket of claim 1, further comprising a sensor member configured to substantially fill the tunnel, such that the sensor member is disposed intermediate the bridge portion and the windscreen.

3. The mirror bracket of claim 2, wherein the mirror receptacle includes:
   a dovetail profile; and
   a wedge profile,
   wherein the rearview mirror includes a corresponding wedge and a corresponding dovetail configured to interface with the dovetail profile and the wedge profile.

4. The mirror bracket of claim 3, wherein the sensor member includes:
   a humidity sensor; and
   a rain sensor.

5. The mirror bracket of claim 4, wherein the mirror receptacle is configured to receive a double-pivot rearview mirror.

6. The mirror bracket of claim 1, wherein the mirror receptacle includes:
   a dovetail profile; and
   a wedge profile,
   wherein the rearview mirror includes a corresponding wedge and a corresponding dovetail configured to interface with the dovetail profile and the wedge profile.

7. The mirror bracket of claim 6, further comprising a sensor member configured to substantially fill the tunnel, such that the sensor member is disposed intermediate the bridge portion and the windscreen, wherein the sensor member includes:
   a humidity sensor; and
   a rain sensor.

8. The mirror bracket of claim 7, wherein the mirror bracket is configured to route a wiring harness, and further comprising:
   a wiring channel formed in line with the tunnel;
   a first wiring hook disposed on a first side of the bridge portion, wherein an open portion of the first wiring hook faces the windscreen; and
   a second wiring hook disposed on a second side of the bridge portion opposite the first side of the bridge portion, wherein an open portion of the second wiring hook faces the windscreen,
   wherein the wiring harness is configured to pass through one of a first route for a right-hand drive vehicle and a second route for a left-hand drive vehicle, and
   wherein the first route passes the wiring harness through the wiring channel, then the first wiring hook, and then through the second wiring hook, and the second route passes the wiring harness through the wiring channel, then the second wiring hook, and then through the first wiring hook.

9. The mirror bracket of claim 8, wherein the mirror receptacle and the sensor member are located substantially on a center plane of the mirror bracket.

10. A mirror assembly for a windscreen, comprising:
    a rearview mirror, including:
       a first pivot,
       a second pivot, and
       a mirror housing; and
    a mirror bracket, including:
       a pad portion, wherein the pad portion is configured to attach to an interior of the windscreen,
       a bridge portion formed as a single piece with the pad portion,
       a tunnel defined by the bridge portion and the pad portion, and
       a mirror receptacle configured to attach to the rearview mirror, wherein the mirror receptacle is formed as a single piece with the bridge portion.

11. The mirror assembly of claim 10,
    wherein the mirror receptacle includes:
       a dovetail profile, and
       a wedge profile; and
    wherein the rearview mirror further includes:
       a corresponding wedge configured to interface with the wedge profile of the mirror receptacle, and
       a corresponding dovetail configured to interface with the dovetail profile of the mirror receptacle.

12. The mirror assembly of claim 11, wherein the mirror bracket further includes a sensor member configured to substantially fill the tunnel, such that the sensor member is disposed intermediate the bridge portion and the windscreen.

13. The mirror assembly of claim 12, wherein the sensor member includes:
    a humidity sensor; and
    a rain sensor.

14. An inside rearview mirror bracket configured to receive a rearview mirror for attachment to a windscreen, the mirror bracket comprising:
    a pad portion, wherein the pad portion is configured to attach to an interior of the windscreen;
    a first bridge portion and a second bridge portion formed as a single piece with the pad portion;
    a tunnel defined by the first bridge portion, the second bridge portion, and the pad portion;
    a mirror receptacle formed as a single piece with the first bridge portion and the second bridge portion and configured to receive the rearview mirror, wherein the mirror receptacle is opposite the tunnel such that a portion of the tunnel is fully enclosed by the first bridge portion, the second bridge portion, and the mirror receptacle; and
    a sensor member configured to substantially fill the tunnel, such that the sensor member is disposed intermediate the windscreen and the mirror receptacle, and a portion of the sensor member is enclosed by the first bridge portion, the second bridge portion, the windscreen, and the mirror receptacle.

15. The mirror bracket of claim 14, wherein the mirror receptacle includes:
    a dovetail profile; and
    a wedge profile,
    wherein the rearview mirror includes a corresponding wedge and a corresponding dovetail configured to slidably interface with the dovetail profile and the wedge profile, such that the mirror bracket is configured to slidably receive the rearview mirror.

16. The mirror bracket of claim 15, wherein the mirror bracket is configured to route a wiring harness, and further comprising:
- a wiring channel formed in line with the tunnel;
- a first wiring hook disposed on a first side of the first bridge portion and the second bridge portion facing away from the tunnel, wherein an open portion of the first wiring hook faces the windscreen; and
- a second wiring hook disposed on a second side of the first bridge portion and the second bridge portion facing away from the tunnel and opposite the first side of the bridge portion, wherein an open portion of the second wiring hook faces the windscreen,
- wherein the wiring harness is configured to pass through one of a first route for a right-hand drive vehicle and a second route for a left-hand drive vehicle, and
- wherein the first route passes the wiring harness through the wiring channel between the mirror bracket and the windscreen, then the first wiring hook, and then through the second wiring hook, and the second route passes the wiring harness through the wiring channel, then the second wiring hook, and then through the first wiring hook.

* * * * *